No. 842,523. PATENTED JAN. 29, 1907.
H. CARROW.
SUPPORT FOR VEHICLE TOPS.
APPLICATION FILED OCT. 20, 1906.
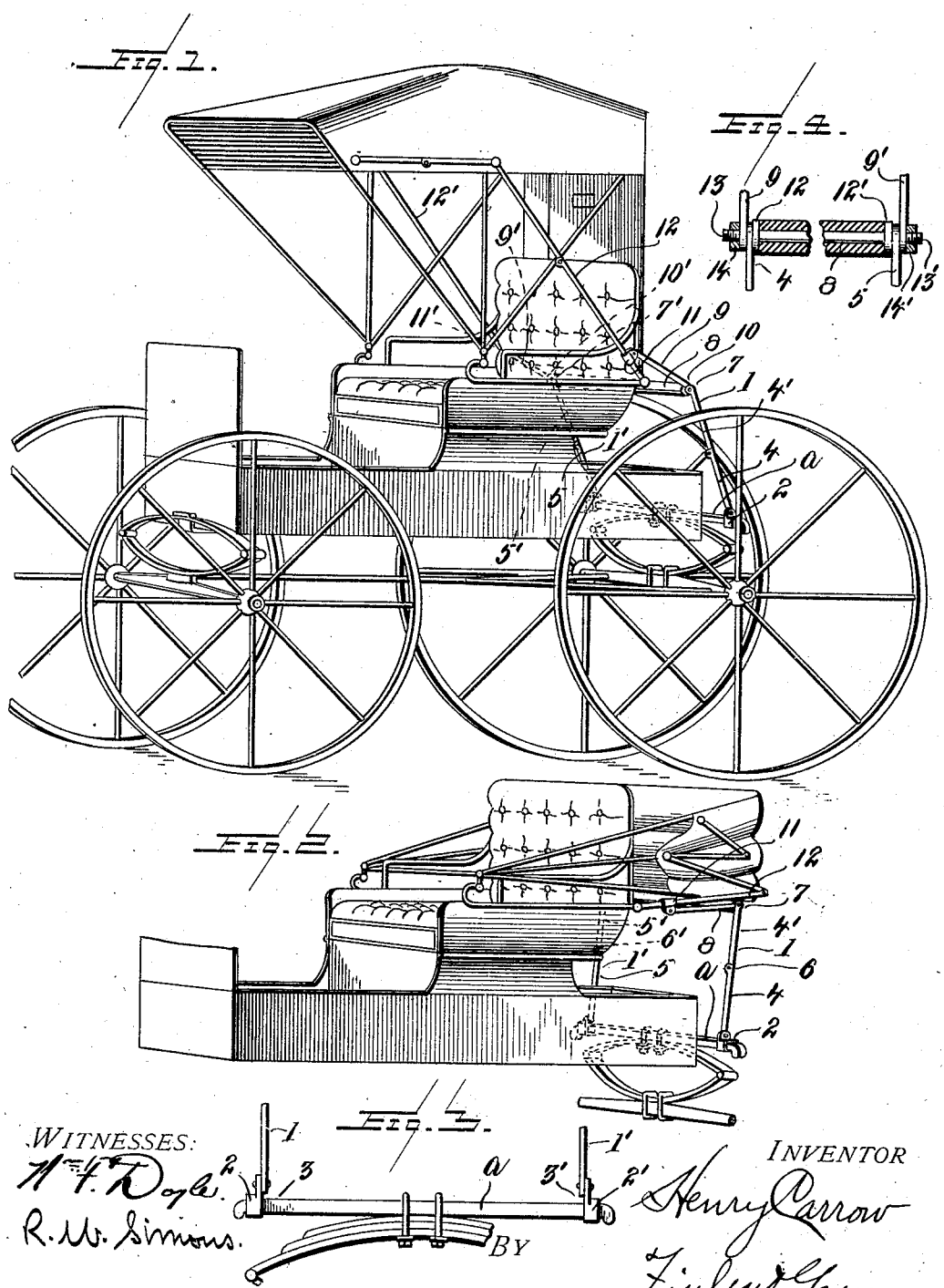

UNITED STATES PATENT OFFICE.

HENRY CARROW, OF BONNETERRE, MISSOURI.

SUPPORT FOR VEHICLE-TOPS.

No. 842,523.  Specification of Letters Patent.  Patented Jan. 29, 1907.

Application filed October 20, 1906. Serial No. 339,760.

*To all whom it may concern:*

Be it known that I, HENRY CARROW, a citizen of the United States, residing at Bonneterre, in the county of St. Francois and State of Missouri, have invented a new and useful Improvement in Supports for Vehicle-Tops, of which the following is a specification.

My invention relates to new and useful improvements in attachments for vehicles, whereby the tops thereof may be supported in its lowered position, and thereby prevent injury to the frame and supports of said top from undue strain.

The object of the invention is to provide an attachment of simple and durable construction which may be readily attached to a vehicle and which is adapted to provide means for supporting the top of the vehicle.

With the above and other objects in view the invention consists generally of a jointed frame attached to the rear portion of the bed or frame of a vehicle or to any part of the vehicle moving with the top to be supported and to the bows of the vehicle-top on each side thereof, which are connected by a cross-rod intermediate of their ends, adapted to form a rest or support for the top when in a lowered position.

In the accompanying drawings, illustrating my invention, Figure 1 is a perspective view of the body of a vehicle, showing the top thereof raised and my top-supporting attachment in position thereon. Fig. 2 is a similar view showing the top lowered. Fig. 3 is a detail view of the preferred means of attaching the jointed frame to the vehicle-spring, and Fig. 4 is a detail view of the cross rod or support of the vehicle-top.

Referring to the drawings, 1 and 1' designate the lower rods of the attachment, which are provided at their lower extremities with yokes or clips 2 and 2', which are preferably secured adjacent to the ends of the bar $a$, carried on the rear spring of the vehicle at 3 and 3'. Said lower rods are each comprised of two sections 4 and 4' and 5 and 5', which are coupled at the knuckle-joints 6 and 6'.

The upper ends of the lower rods 1 and 1' are somewhat enlarged and are provided with eyes 7 and 7', in which fit the ends of the cross-bar 8, hereinafter more fully described.

The upper rods 9 and 9' are enlarged at their lower ends and are provided with eyes 10 and 10' and at their upper ends with yokes or clips 11 and 11', adapted to be secured to the rear bows or supports 12 and 12' of the said vehicle-top.

The cross-bar 8 (before mentioned) is adapted to be secured at its ends within the eyes in the ends of the upper and lower rods 1 and 1' and 9 and 9', thereby coupling the rods on each side of the vehicle and connecting the rods on the opposite sides thereof. For this purpose said cross-bar is of substantially the same length as the width of the vehicle and is provided adjacent to its ends with flanges 12 and 12' and threads 13 and 13', adapted to receive the internally-threaded nuts 14 and 14'. The ends of said rods are secured on the cross-bar between the said flanges and nuts.

The cross-bar 8 is covered with leather or felt or other protecting material for the purpose of preventing scratching or otherwise marring that portion of the vehicle-top which is adapted to rest thereon.

In operation the attachment herein described is secured at its lower ends to the cross-bar secured to the spring of the vehicle and at its upper ends to the bow of the top, and the sectional frame on each side connected intermediate of their ends by a cross-bar located in the rear of the vehicle-top. When the top is lowered, the cross-bar is carried backward and is located near the rear of the top which rests thereon and is supported thereby, thus relieving the strain on the frame of the top and consequent injury thereto. When the top is again raised, the attachment assumes its position shown in Fig. 1 of the drawings.

Having thus described my invention, what I claim as new, and desire to be secured by Letters Patent, is—

In a vehicle attachment of the character described, the combination with a sectional rod on each side of a vehicle adapted to be secured at their opposite ends to the vehicle-spring and bow of the top, and a transverse bar connecting the said sectional rods adapted to support the top of the vehicle when lowered, substantially as described.

In testimony whereof I have signed my name to this specification in the presence of two subscribing witnesses.

HENRY CARROW.

Witnesses:
 H. D. EVANS,
 J. D. DE BUCHANANNE.